United States Patent Office 3,321,956
Patented May 30, 1967

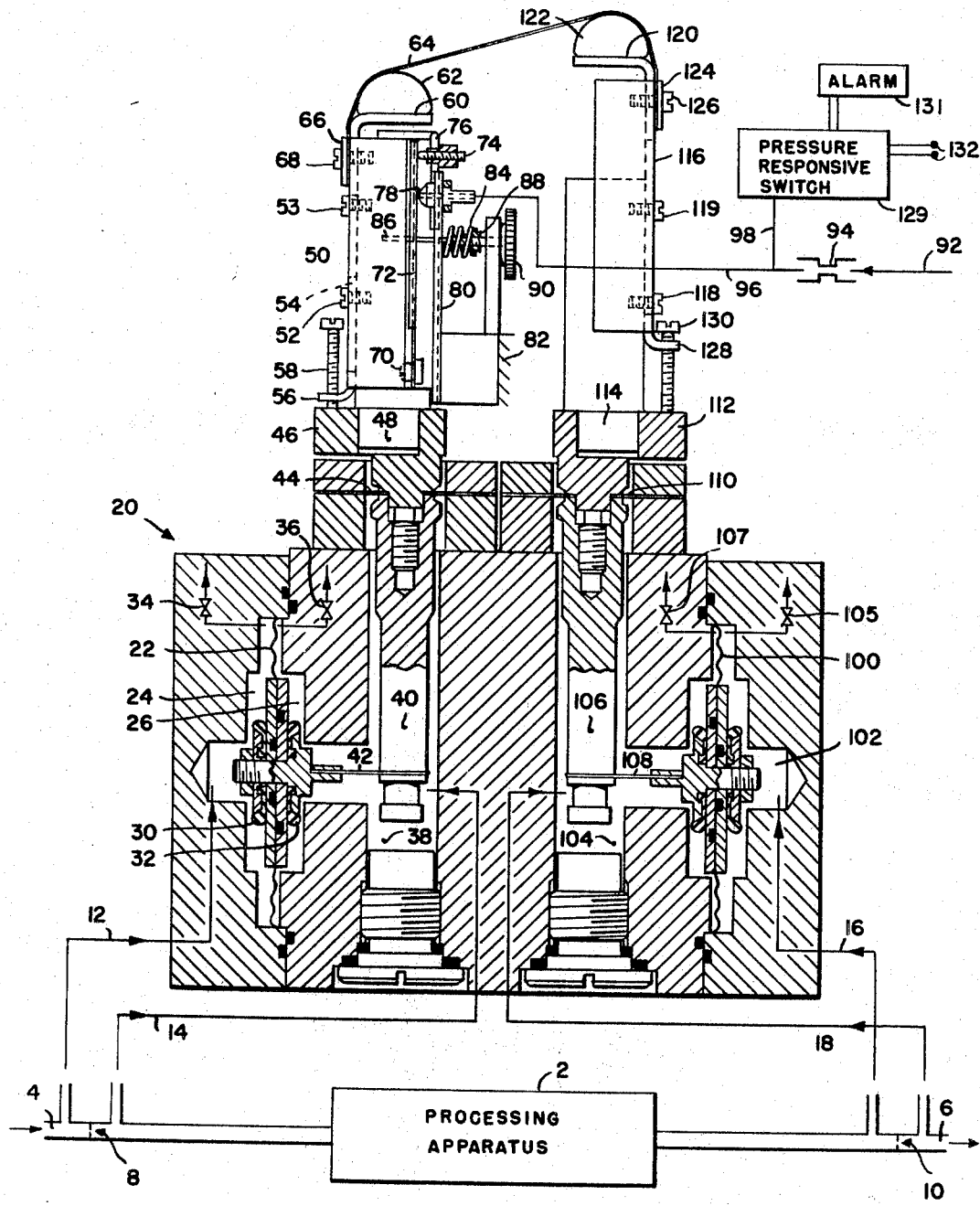

3,321,956
FLOW LEAK DETECTOR
Louis A. Ollivier, Los Gatos, Calif., assignor to Fischer & Porter Company, Warminster, Pa., a corporation of Pennsylvania.
Filed Aug. 6, 1964, Ser. No. 387,946
6 Claims. (Cl. 73—40.5)

This invention relates to a flow leak detector particularly adapted for the detection of leakage in processing apparatus such as heaters, coolers, chemical reactors or the like, especially those operating at high pressures.

Immediate warning of the occurrence of leakage in apparatus of the type indicated is desirable since in many instances such leakage is either dangerous or can produce great damage. In many systems wherein liquids are being treated, either chemically or physically, volumetric inflow and outflow will be equal under normal conditions of operation, but even when some volumetric contraction or expansion takes place the inlet and outlet volumetric flows are in definite proportion to each other. A deviation from the normal relationship between the inlet and outlet flows will be indicative of leakage, and it is the general object of the present invention to provide an apparatus for detection of abnormal volumetric flow conditions.

In many types of processing equipment there may exist large pressure differentials between the inlet and outlet. Under these conditions the change of flow rate relationship must be determinable despite such a pressure gradient, and even if the gradient varies during operation. This gradient may involve a pressure drop in some cases and in other cases where the processing apparatus may contain a pump there may be involved a pressure increase. In accordance with the invention detection of leakage is achieved despite the pressure gradient conditions existing between the inlet and outlet. It may be here noted that usually heretofore detection of leakage has been dependent upon an abnormal drop in pressure; but such detection presupposes the maintenance of a definite normal pressure at some point in the system, whereas in many processing systems such a definite pressure may not exist, but the system may operate normally with varying pressures. Another way in which leakage has been detected has been by an abnormal flow rate at some point in the system. But definite normal flow rates are also unrealistic in connection with many processes, and the flow rate may vary during quite normal operations. In contrast with the foregoing, the comparison of two flow rates makes detection possible despite pressure variations or flow rate variations.

More detailed objects of the invention will become apparent from the following description, read in conjunction with the accompanying drawing, in which the figure illustrates primarily a leakage detection, partly in section, in association with a diagrammatic indication of a system in which it is incorporated.

A processing apparatus is indicated at 2, and is not detailed because it may assume a great variety of forms, either simple or quite elaborate. In some of the simpler forms it might be merely a cooling or heating apparatus operating at either relatively low or quite high pressures or even under vacuum conditions in which case, of course, leakage would generally be inwardly rather than outwardly. In the case of heating or cooling apparatus, the volumetric rate of outflow will generally be substantially equal to the volumetric rate of inflow except for possible thermal changes of volume which are generally small or, at any rate, rather definitely related in a fixed ratio. The processing apparatus may involve chemical reaction in which an inflowing liquid or mixture, possibly including suspended solid material, may be chemically changed. In such case the volumetric rate of outflow may be different from the volumetric rate of inflow; but generally under normal conditions a definite ratio of these will exist. The apparatus may operate under substantially constant pressure conditions throughout, i.e., the inlet pressure may be substantially equal to the outlet pressure except for relatively low friction losses; but in other cases there may be large pressure differences between the inlet and outlet, as when the apparatus involves internal pumping means, or involves pressure relief.

Inlet and outlet lines are indicated at 4 and 6. For simplicity of description it will be assumed that there is a single inlet line and a single outlet line involving the outflow of all the materials which flow in. As will be pointed out later, multiple inflow or multiple outflow lines may be accommodated in accordance with the invention.

The inflow line 4 is illustrated as containing an orifice 8, while the outflow line 6 is illustrated as, containing an orifice 10. The pressure drop across the orifice 8 produces a differential pressure between the sampling tubes 12 and 14. Similarly the pressure drop across the orifice 10 produces a differential pressure between the tubes 16 and 18. In each case the pressure drop across the orifice is a measure of flow rate through the corresponding connection. The volumetric flow rate as measured by the pressure drop is only a slowly varying function of the absolute pressure, and the apparatus of the present invention, which depends for its operation on the differences of the pressure drops is thus relatively insensitive to the absolute pressures existing in the conduits 4 and 6 though these pressures may be quite different.

An assembly 20 of stacked elements provides chambers in a fashion which will be evident from the figure. Within this assembly a diaphragm 22 is provided, secured at its periphery and having a rigid central assembly. The diaphragm defines a pair of chambers 24 and 26. Annular packing members 30 and 32 form part of the central assembly and by engagement with surfaces of the housing close off portions of the chambers 24 and 26 in the event that abnormal pressures exist so that trapped liquid will prevent damaging distortion of the flexible portion of the diaphragm. The chambers on the opposite sides of the diaphragm are desirably filled with a silicone oil and communicate with the tubes 12 and 14. Vent valves 34 and 36, which are normally closed, provide for the filling of the chambers initially.

The chamber 26 is continued as a chamber 38 in which there depends the lower member 40 of a lever assembly which is connected to the central portion of the diaphragm 22 by a flexible link 42 taking the form of a sheet metal member clamped both to the central portion of the diaphragm and to the lower potrion of the member 40. A diaphragm 44 clamped in the housing assembly closes the upper end of the chamber extension 38 and has its central portion clamped between the member 40 and another member 46 of the lever assembly. This diaphragm forms part of the flexible pivot for the lever assembly which need have only a very slight movement as will become more apparent hereafter. Secured in the member 46 is a further member 48 of the lever assembly which has an upward extension to which there is clamped an adjustable further member 50 of the assembly, adjustable clamping being effected by screws at 52 and 53 which are threaded into the member 48 and pass through an elongated slot 54 in the member 50. In order to provide for fine adjustment of the position of the member 50, it is provided with an ear 56 threaded to receive a screw 58 which abuts the upper surface of the member 46. Upon freeing the clamping screws 52 and 53, the screw 58 may be adjusted to move the member 50 vertically, and when a proper position has been achieved, the clamping screws 52 and 53 may be again tightened.

The upper end of the member 50 is turned horizontally at 60 and carries a cylindrical member 62 over which a band 64 of metal is clamped by the clamping element 66 and screw 68. The band 64 is in the form of a thin ribbon and serves to connect the upper ends of two lever assemblies, one of which has just been described.

Secured to the lower end of member 48 at 70 is a flexible sheet metal baffle 72 which tends to spring outwardly to a position adjustably limited by a screw 74 threaded into a bracket 76 secured to the upper end of member 48. This baffle cooperates with a nozzle 78 having an opening which normally closely approaches the baffle during opeartion. The nozzle 78 is secured in a bracket 80 secured to a fixed portion of the frame indicated at 82.

A bias spring 84 is connected at 86 to the lever member 48 and to a nut 88 restrained against rotation by a pin (not shown) and threaded on the adjusting screw 90 journalled in the fixed portion of the frame.

Compressed air is supplied at 92 through a pneumatic restriction 94 to a tube 96 which is connected to the nozzle to supply flow of air therethrough. Air pressure depending on the position of the baffle 72 with respect to the nozzle 78 is supplied through a connection tube 98.

At the right hand side of the apparatus the diaphragm, chamber, and lever assembly of the type just described is substantially duplicated, and need be only briefly described. The diaphragm 100 is between the chambers 102 and 104 connected respectively to the pressure lines 16 and 18 previously described. Bleed valves 105 and 107 are provided for the filling of the chambers with a silicone or similar oil.

The right-hand lever assembly comprises the lower member 106 which is connected by the flexible leaf 108 to the rigid central portion of the diaphragm 100. The assembly is clamped to the flexible diaphragm closure 110 which provides the pivot for the right-hand lever assembly. A member 112 of this assembly carries the member 114, to which the member 116 is clamped by the screws 118 and 119 passing through a slot therein. The member 116 has the horizontally turned ear 128 in which is threaded the screw 130 to abut the member 112 and provide for fine adjustment of the member 116 lengthwise in the same fashion as previously described for the member 50. The upper turned end 120 of the member 116 supports the cylindrical member 122 across which the band or ribbon 64 extends to be secured by the clamp 124 and screw 126.

The tube 98 previously mentioned communicates with a pressure responsive switch 129 which serves to actuate an alarm 131, current for this purpose being supplied to the switch through power leads 132.

The operation of the detector is as follows:

Assuming that the processing apparatus 2 is operating properly, so that no leakage is occurring between the inlet 4 and the outlet 6, the volumetric flows into the inlet and from the outlet will either be equal or will be in some particular proportion to each other or within a relatively narrow range of a fixed proportion. If, therefore, the orifices 8 and 10 had a definite relationship to each other, equal in cross-sectional area or unequal, during normal operation there will be a definite relationship between the pressure drop from tube 12 to tube 14 to the pressure drop from the tube 16 to the tube 18. Even if not fixed, this difference between the two pressure drops will be within some range definitive of proper operation. The range of acceptable relationships may depend in various instances on such matters as viscosity changes, temperature changes, pressure changes, where these are large, etc. While such factors must be taken into account, normal operation will correspond to the maintenance of the difference of the pressure drops (the latter due to volumetric flow) within relatively narrow bounds. However, if a leak occurs in the processing apparatus, the relationship of the two pressure drops will generally change quite abruptly, and it is this change which is relied upon to give the warning signal of leakage.

The pressure drop existing between the sampling tubes 12 and 14 will appear across the diaphragm 22 to provide a torque tending to rotate the left-hand lever assembly counterclockwise to produce a left-hand movement at its upper end.

The pressure drop between the sampling tubes 16 and 18 will correspondingly act on the diaphragm 100 to move the upper end of the right-hand lever assembly toward the right. It may here be noted that the flexible links 42 and 108 while of thin metal are chosen to have sufficient stiffness to exert a pushing action in compression.

The setting of the movable parts need not be described in detail since the steps involved will be obvious. The lengthwise adjustments of the lever members 50 and 116, utilizing the fine adjustment means provided by the screws 58 and 130, serve to set the lever arms above the pivots to take care of the differential conditions involved at the two orifices 8 and 10. The ribbon 64 may be adjusted and clamped to hold the levers normally in their approximately center positions. Spring 84 is adjustable for bias adjustment. When the levers are set in their desired positions adjustment of the screw 74 sets the position of the baffle 72 relative to the nozzle 78 to produce a desired pressure through connection 98 to hold the pressure responsive switch in its desired position so as not to operate the alarm 131. The normal position to maintain the alarm inoperative may be with the switch closed or open. The switch in closed position may keep the alarm from operating through a suitable relay if the alarm is to be operated by an auxiliary power supply which might become effective if the main power supply failed. The particular arrangement of alarm and alarm control used may depend on whether or not fail-safe conditions for operation are required.

It is desirable that the switch should be operated in a fashion to cause the alarm to give a warning by reduction of pressure in the connection 98 rather than by increase of pressure, so that an alarm will be given if the air supply fails. This is the arrangement which is illustrated. When the baffle 72 moves toward the left away from the nozzle 78, the pressure in connection 98 will drop. Remembering that the pressure drop across the diaphragm 22 normally tends to produce a left-hand motion of the upper end of the left-hand lever assembly, i.e., removing the baffle from the nozzle, it will be evident that if the flow through the outlet 6 decreases, as the result of leakage, the pressure drop between the tubes 16 and 18 will decrease, producing a movement of the diaphragm 100 toward the right and a movement of the upper end of its connected lever assembly to the left, the force for accomplishing this originating in the pressure drop across the diaphragm 22. Thus there is produced the pressure drop in connection 98 to signal leakage.

By reason of the adjustments which are provided sufficient pressure drop to operate the alarm may be avoided to conform with mere changes of flow rate which may be incidental to the process and not the result of leakage. In this same fashion, tolerance, without alarm, may be provided for the other normal variations in the process, including large changes of pressures. In other words, the system may be made more or less sensitive depending upon the particular process apparatus to which it is applied.

The alarm may, of course, be visual, audible, remote, or may act as an automatic controller, as desired. While referred to as an alarm, it will be evident that its major function may be to trip to close position some valve which, by stopping flow, may automatically prevent danger or damage. Similarly, heating fuel may be cut off, pumps stopped, or other operations may be controlled.

The term "signalling means" may be used to define the quite general operation of the devices shown at 129 and 131.

As mentioned above, the invention is applicable to systems in which there may be divided inflows and/or divided outflows. Adaptation for these conditions may be effected in obvious fashion merely by causing one or both of the lever assemblies already described to be jointly responsive to more than a single pressure drop. For example, in the case of a chemical process in which two reactants enter an apparatus to produce a single product, it will be evident that the sum of the input flows will normally have a particular relationship to a single outflow, being usually equal to or approximately equal to the latter. It will be evident that in such case the diaphragm and chamber assembly corresponding to 22 may be duplicated so that two flows jointly control the left-hand lever assembly.

It will be exident that numerous variations in details of construction and operation may be changed without departing from the invention as defined in the following claims.

What is claimed is:

1. Apparatus for the detection of leakage in apparatus through which fluid flow is occurring comprising means providing a first output which is a function of fluid flow into the apparatus, means providing a second output which is a function of a fluid flow from the apparatus, balancing means responsive to both of said outputs and balancing one of said outputs against the other, means adjusting the magnitude of at least one of said outputs, and means responsive to the condition of said balancing means providing a signal as the result of an abnormal relationship of said outputs.

2. Apparatus for the detection of leakage in apparatus through which fluid flow is occurring comprising means providing a first output pressure differential which is a function of fluid flow into the apparatus, means providing a second output pressure differential which is a function of fluid flow from the apparatus, balancing means responsive to both of said pressure differentials and balancing one of said pressure differentials against the other, means adjusting the effective action of at least one of said pressure differentials on said balancing means, and means responsive to the condition of said balancing means for providing a signal as a result of an abnormal relationship of said pressure differentials.

3. Apparatus for the detection of leakage in apparatus through which fluid flow is occurring comprising a first orifice through which fluid flows into the apparatus, means providing a first output as a function of the pressure drop across said first orifice, a second orifice through which fluid flows from the apparatus, means providing a second output as a function of the pressure drop across said second orifice, and balancing means responsive to both of said outputs and balancing one of said outputs against the other, means adjusting the magnitude of at least one of said outputs, and means responsive to the condition of said balancing means for providing a signal as a result of an abnormal relationship of said outputs.

4. Apparatus for the detection of leakage in apparatus through which fluid flow is occurring comprising a first orifice through which fluid flows into the apparatus, a first diaphragm, means providing a first pair of chambers separated by the first diaphragm, means connecting said chambers respectively to opposite sides of said first orifice, a second orifice, a second diaphragm, means providing a second pair of chambers separated by the second diaphragm, means connecting the chambers of said second pair respectively to opposite sides of said second orifice, means interconnecting said first and second diaphragms in force opposition, means for adjusting the force applied by at least one of said diaphragms to said means interconnecting said first and second diaphragms, and means controlled by said interconnecting means to provide a signal when the difference in the forces exerted by said diaphragms exceeds a predetermined value.

5. Apparatus for the detection of leakage in apparatus through which fluid flow is occuring comprising a first orifice through which fluid flows into the apparatus, a first diaphragm, means providing a first pair of chambers separated by the first diaphragm, means connecting said chambers respectively to opposite sides of said first orifice, a second orifice, a second diaphragm, means providing a second pair of chambers separated by the second diaphragm, means connecting the chambers of said second pair respectively to opposite sides of said second orifice, means interconnecting said first and second diaphragms in force opposition, means for adjusting the force applied by at least one of said diaphragms to said means interconnecting said first and second diaphragms, and means controlled by said interconecting means to provide a signal when the difference in the forces exerted by said diaphragms exceeds a predetermined value, due to reduction of the force exerted by said second diaphragm on said interconnecting means.

6. Apparatus for the detection of leakage in apparatus through which fluid flow is occurring comprising a first orifice through which fluid flows into the apparatus, a first diaphragm, means providing a first pair of chambers separated by the first diaphragm, means connecting the chambers of said first pair respectively to opposite sides of said first orifice, a second orifice through which fluid flows outwardly from said apparatus, a second diaphragm, means providing a second pair of chambers separated by the second diaphragm, means connecting the chambers of said second pair respectively to opposite sides of said second orifice, a first lever, flexible means sealing one of said first pair of chambers and secured to said first lever to provide a pivotal mounting therefor, said lever extending partly into said one of said first pair of chambers and partly outwardly thereof, means connecting said first diaphragm to the part of said first lever extending into said one of said first pair of chambers to rotate, said lever about an axis in response to movement of said first diaphragm, a second lever, flexible means sealing one of said second pair of chambers and secured to said second lever to provide a pivotal mounting therefor, said second lever extending partly into said one of said second pair of chambers and partly outwardly thereof, means connecting said second diaphragm to the part of said second lever extending into said one of said second pair of chambers to rotate said second lever about an axis in response to movement of second diaphragm, means interconnecting the parts of said first and second levers extending outwardly of the chambers in force opposition and means controlled by said levers and responsive to movement of said levers to provide a signal when the difference in the forces exerted by the diaphragms on said first and second levers exceeds a predetermined value.

References Cited

UNITED STATES PATENTS 2,564,133    8/1951    Stadler  ---------- 200—153.22
2,635,153    4/1953    Wilson  ------------ 200—81.9

FOREIGN PATENTS 581,374    7/1933    Germany.

LOUIS R. PRINCE, *Primary Examiner.*

W. A. HENRY, *Assistant Examiner.*